United States Patent [19]

Debuisser

[11] 4,156,876
[45] May 29, 1979

[54] AUTOCORRELATION SIDELOBE SUPPRESSION DEVICE FOR A CONTINUOUS PERIODIC PHASE-CODED SIGNAL

[75] Inventor: Jean-Claude A. Debuisser, Velizy, France

[73] Assignee: International Standard Electric Corporation, New York, N.Y.

[21] Appl. No.: 860,147

[22] Filed: Dec. 14, 1977

[30] Foreign Application Priority Data

Dec. 16, 1976 [FR] France ................................ 76 38006

[51] Int. Cl.$^2$ ............................................ G01S 9/233
[52] U.S. Cl. .......................... 343/17.2 PC; 343/5 DP; 343/100 CL
[58] Field of Search ................. 343/17.2 PC, 100 CL, 343/5 DP

[56] References Cited

U.S. PATENT DOCUMENTS 3,887,918  6/1975  Bailey et al. ............. 343/100 CL X
3,955,197  5/1976  Gutleber et al. ............. 343/17.2 PC Primary Examiner—Maynard R. Wilbur
Assistant Examiner—Richard E. Berger
Attorney, Agent, or Firm—William T. O'Neil

[57] ABSTRACT

A device for suppressing autocorrelation sidelobes in a pseudo-random coded radar system employing a phase-coded CW signal in which the phase code is preselected to have a predetermined symmetry. Autocorrelation is affected in the standard manner and also in respect to the transmitted code shifted by one bit in time. Summation of the two autocorrelation functions provides a new autocorrelation function in which the sidelobes between main correlation peaks are suppressed.

12 Claims, 16 Drawing Figures

AUTOCORRELATION SIDELOBE SUPPRESSION DEVICE FOR A CONTINUOUS PERIODIC PHASE-CODED SIGNAL

BACKGROUND OF THE INVENTION

This invention relates generally to pseudo-random coded systems and, more particularly, concerns the supppression of autocorrelation sidelobes of a periodic phase-coded CW signal; for example, in CW and pulse-compression radar systems.

Radar employing pseudo-random coded (PRC) transmission and autocorrelation detection has the advantage of requiring a relatively low peak power on transmission, which permits the use of small and less costly transmitters.

The technical literature on the subject is extensive, and a background may be obtained from any of a number of texts; for example, the text MODERN RADAR by Raymond Berkowitz (John Wiley & Sons, Inc., publisher—1965).

In the presence of relatively near targets, the detection range of PRC radars is restricted due to the existence of sidelobes in the autocorrelation function of the phase code, the sidelobes of close target echoes being able to mask the echoes of more distant targets.

The general object of this invention is the provision of a device to suppress the autocorrelation sidelobes of a phase-coded periodic CW signal in order to overcome the above-mentioned problem.

SUMMARY OF THE INVENTION

According to the invention, the approach for suppressing autocorrelation sidelobes consists in providing apparatus for:

selecting a phase code whose autocorrelation function has sidelobes presenting a symmetry such that sum of the said function and the same function shifted by a time T gives a zero level between the main peaks;

obtaining the autocorrelation signal of the said phase code;

obtaining the said autocorrelation signal shifted by a time T;

and summing the two shifted autocorrelation signals.

Other characteristics and advantages of this invention will be evident from the following description of particular embodiments, the said description being related to the accompanying drawings.

DETAILED DESCRIPTION

For an easier understanding of the invention, it is desirable to first review certain familiar points concerning the autocorrelation function of a phase-coded periodic signal, in connection with FIGS. 1, 2, 3 and 4.

Figure 1:
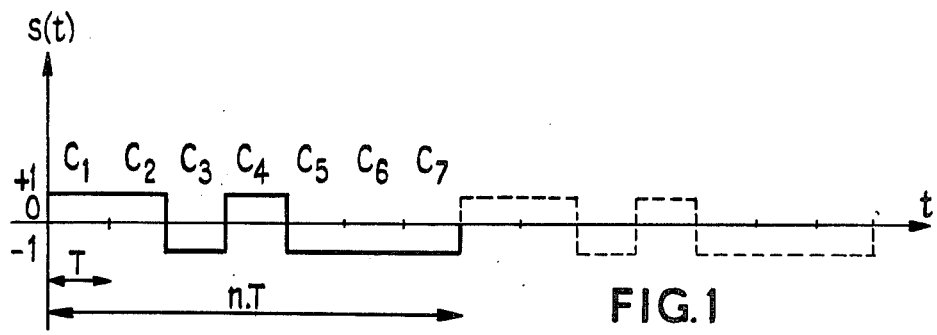
FIG. 1 shows a periodic signal s(t) generated from a given phase code of n moments (bits).

FIG. 1 shows an example of a periodic signal s(t) representing a cyclic code of n bits (for example, n=7) with respective levels $C_1$ to $C_n$, ech level having a value of +1 or −1. Thus, in the given example, we have:

$C_1 = +1$
$C_2 = +1$
$C_3 = -1$
$C_4 = +1$
$C_5 = -1$
$C_6 = -1$
$C_7 = -1$

The levels $C_1$ to $C_n$ will be designated by $C_i$ (i=1 to n). Each bit is transmitted during a period T, and the corresponding signal may also be called a "subpulse", the complete phase code having a length nT. The transitions of signal s(t) (changes from level +1 to level −1 and vice versa) cause a phase jump of $\pi$ on the carrier signal transmitted by the radar.

Figure 2:
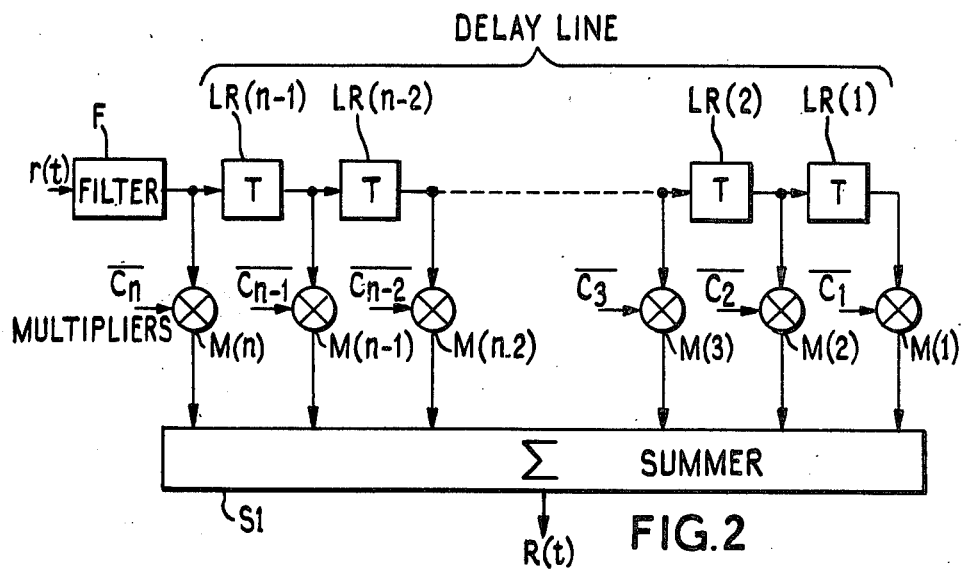
FIGS. 2 and 3 show familiar embodiments of matched receivers.
Figure 3:
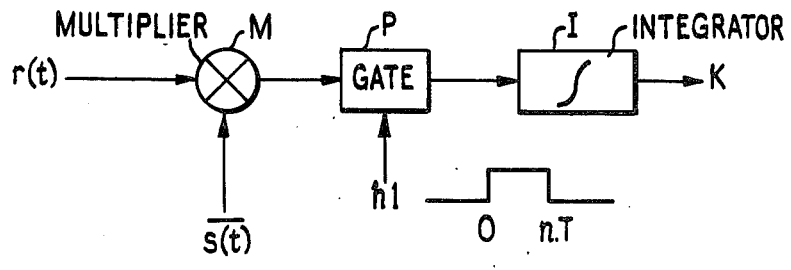

The signal s(t) autocorrelation function is obtained in a way well known to the person of skill in this art by means of "matched" receivers represented in FIGS. 2 and 3. The video signal received by the matched receiver after reflection from a target will be called r(t). This signal corresponds to the signal s(t) delayed by the two-way transit time from the radar to a reflecting object.

In the familiar matched receiver shown in FIG. 2, the received signal r(t) passes first through a filter F matched to the "subpulse" spectrum to improve the signal/noise ratio. The output signal from filter F then passes through (n−1) identical delay lines LR(1) to LR(n−1) connected in series, each introducing a delay T equal to the width of a "subpulse". The output signals of each of the delay lines LR(1) to LR(n−1) and of filter F are multiplied respectively by the coefficients $\overline{C}_1$ to $\overline{C}_n$, which are conjugates of the coefficients $C_1$ to $C_n$, by means of n multipliers M(1) to M(n). In the following text, the various multiplication coefficients will be called $\overline{C}_i$ (i=1 to n). In the case of the chosen example, the coefficients $C_i$ are identical to the coefficients $C_i$. The n output signals from the n multipliers are added in an adder S1 delivering the autocorrelation signal R(t). At the instant nT, the value R(nT) of the autocorrelation signal, which will be called K, can be written:

$$K = R(nT) = \int_0^{nT} [r(t)] [\overline{s(t)}] \, dt$$

where $\overline{s(t)}$ represents the conjugate signal of r(t).

Another form of receiver matched to the first period of the signal s(t) is shown in FIG. 3. It is derived directly from the expression of K. The received signal r(t)

is multiplied by the conjugate signal $\overline{s(t)}$ by means of a multiplier M, and the result of the multiplication is integrated for a time nT, equal to the period of signal s(t), by means of an integrator I. The operating time of the integrator I is determined by means of a gate P placed at the output of multiplier M and activated when it receives a control pulse h1 having a width nT. The receiver matched to the first period of the signal s(t) delivers the value K of the autocorrelation signal.

When the signals arriving at the two inputs of multiplier M are shifted by a time interval $\Delta t$ with respect to one another, the integrator I delivers a value $H(\Delta t)$ of the auto-correlation signal. By varying $\Delta t$, we obtain the function $H(\Delta t)$ which is the cyclic autocorrelation function of a period of the signal s(t).

Figure 4:
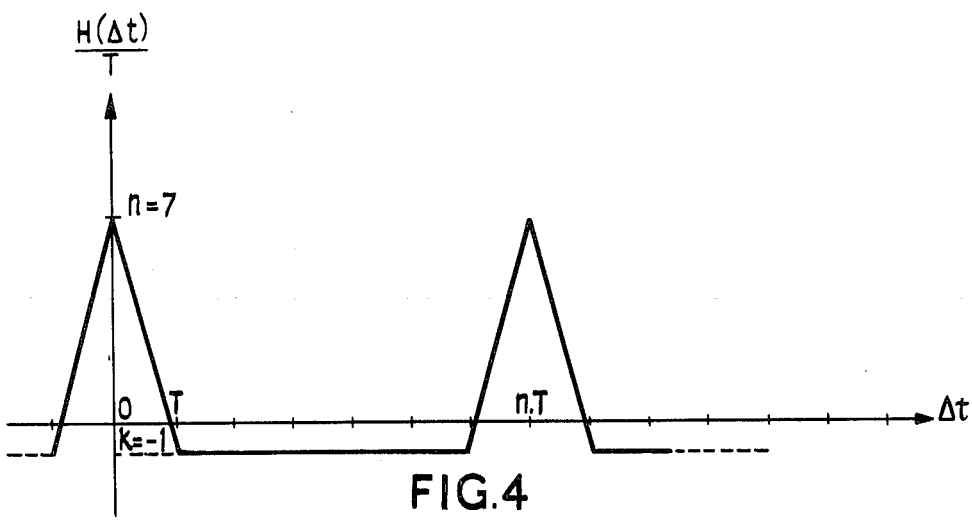
FIG. 4 shows the autocorrelation function of the periodic signal s(t) of FIG. 1.

FIG. 4 shows the well known autocorrelation function $H(\Delta t)/T$ of the periodic signal s(t) in FIG. 1. The code example shown in FIG. 1 is called a "maximum length sequence code". Its autocorrelation function presents the particular characteristics of having sidelobes of constant amplitude k equal to $-1$. The amplitude of the correlation peaks is equal to the number of bits n of the code (n=7). Peaks are present for $\Delta t=0$, nT, 2nT, ...

The "maximum length sequence codes" are part of a more general family of codes, hereinafter called "cyclically almost perfect codes", whose autocorrelation function $H(\Delta t)/T$ presents the following characteristics:

$H(\Delta t)/T = n - (n-k)(\Delta t/T)$ for $0 \leq \Delta t \leq T$ $H(\Delta t)/T = k$ for $T \leq \Delta t \leq (n-1)T$ $H(\Delta t)/T = k + (n-k)[\Delta t/T - (n-1)]$ for $(n-1)T \leq \Delta t \leq nT$ The autocorrelation function of the "cyclically almost perfect codes" has sidelobes of any constant amplitude k.

The principle of suppression of autocorrelation sidelobes in accordance with the invention will now be explained, the heretofore description being understood to be a part of the prior art. It consists in:

(1) selecting a phase code modified with respect to a "cyclically almost perfect code", this modified phase code being obtained by multiplying alternately by $+1$ and $-1$ the successive "subpulses" of the periodic signal s(t) corresponding to the "cyclically almost perfect code"; the periodic signal generated from the said modified phase code being called s'(t);

(2) obtaining the autocorrelation signal of the modified periodic signal s'(t) by means of a receiver matched to the period of the signal s'(t); this matched receiver being conventional and can be of the type shown in FIGS. 2 and 3;

(3) obtaining the said autocorrelation signal shifted by a time T;

(4) summing the two shifted autocorrelation signals.

We observe that the period of the signal s'(t) is equal to nT or 2nT depending upon whether the number n of bits of the "cyclically almost perfect code" is even or odd. The modified phase code according to the invention will, therefore, include n or 2n bits depending upon whether n is even or odd.

Figure 5:
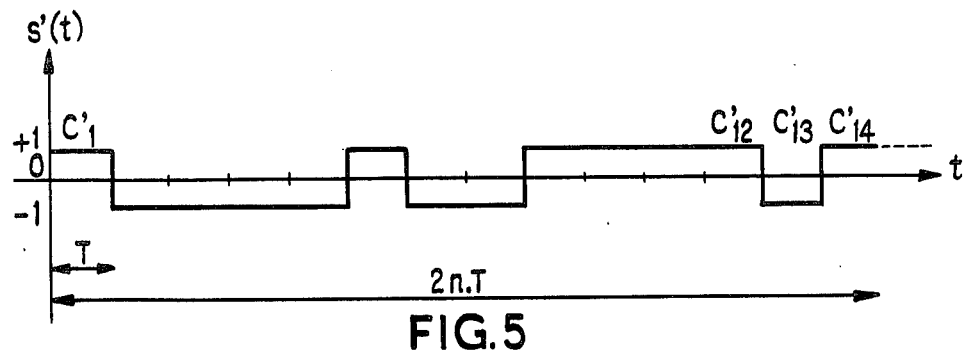
FIG. 5 shows a periodic signal s'(t) modified in accordance with the invention with respect to the signal s(t) of FIG. 1.

FIG. 5 represents the periodic signal s'(t) obtained from the signal s(t) in FIG. 1. Since n is odd in FIG. 1, the period of the signal s'(t) is equal to 2nT.

Figure 6:
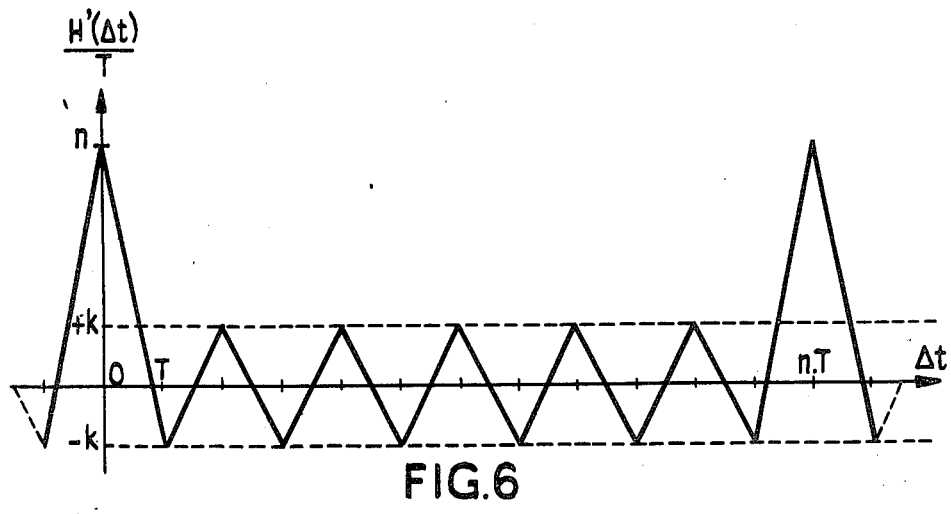
FIGS. 6 and 7 show the autocorrelation functions of the periodic signal s'(t) when n is even and when n is odd, respectively.

FIG. 6 shows the autocorrelation function $H'(\Delta t)/T$ of the signal s'(t) for the case in which n is even. This function, still having main peaks spaced by nT, presents the particular characteristics of having sidelobes in saw-tooth form of level $+k$ and $-k$, as illustrated.

Figure 7:
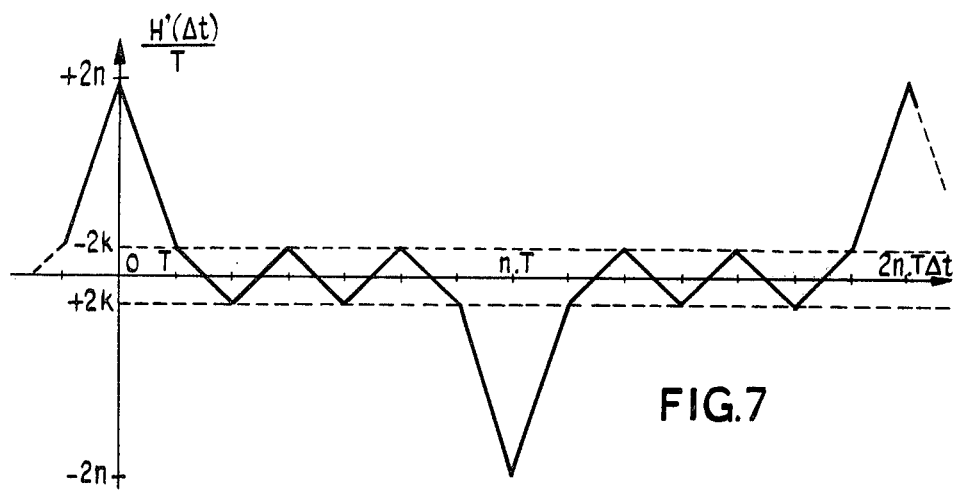

FIG. 7 shows the autocorrelation function $H'(\Delta t)/T$ of the signal s'(t) for the case in which n is odd. This function, which still has main peaks spaced by nT, but of alternating signs, presents the particular characteristic of having sidelobes in sawtooth form of level $+2k$ and $-2k$.

Figure 8:
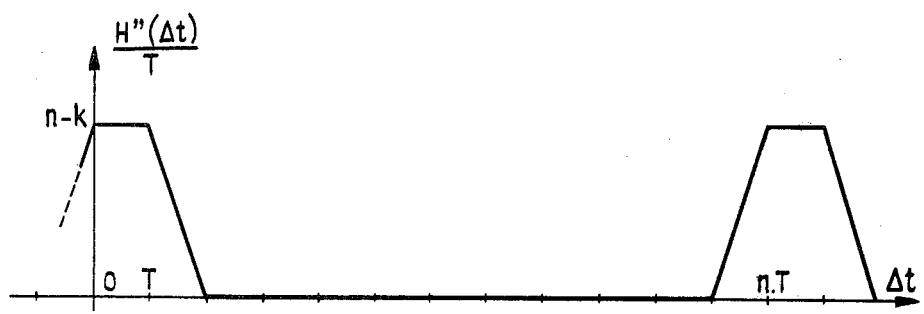
FIGS. 8 and 9 show the modified autocorrelation functions obtained at the output of the device according to the invention when n is respectively even and odd.

FIG. 8 shows the autocorrelation function $H''(\Delta t)/T$ obtained by addition of the autocorrelation function $H'(\Delta t)/T$ of FIG. 6 (n even) and this same function shifted by T.

Figure 9:
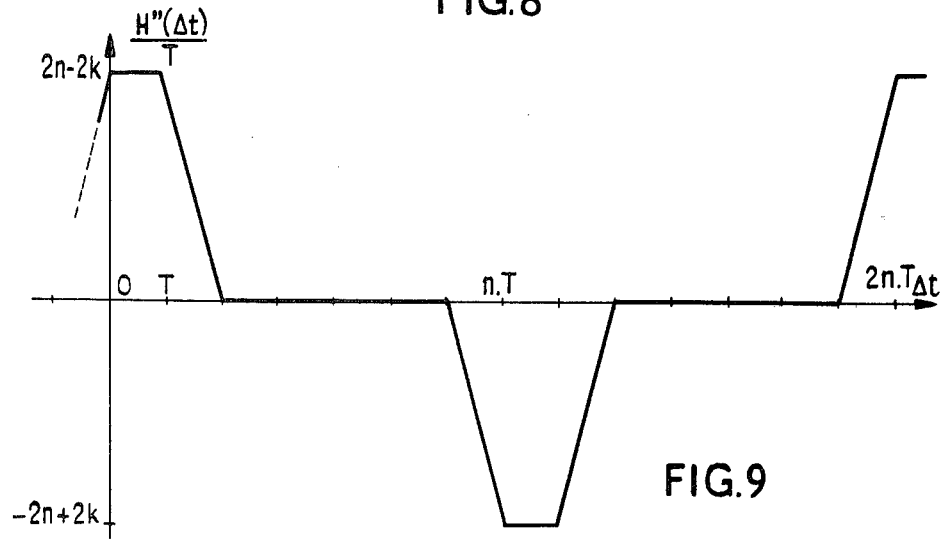

Similarly, FIG. 9 shows the autocorrelation function $H''(\Delta t)/T$ obtained by addition of the autocorrelation function of FIG. 7 (n odd) and this same function shifted by T.

It will be observed, in FIGS. 8 and 9, that only the clipped main peaks remain, whereas the sidelobes are completely suppressed.

Figure 10:
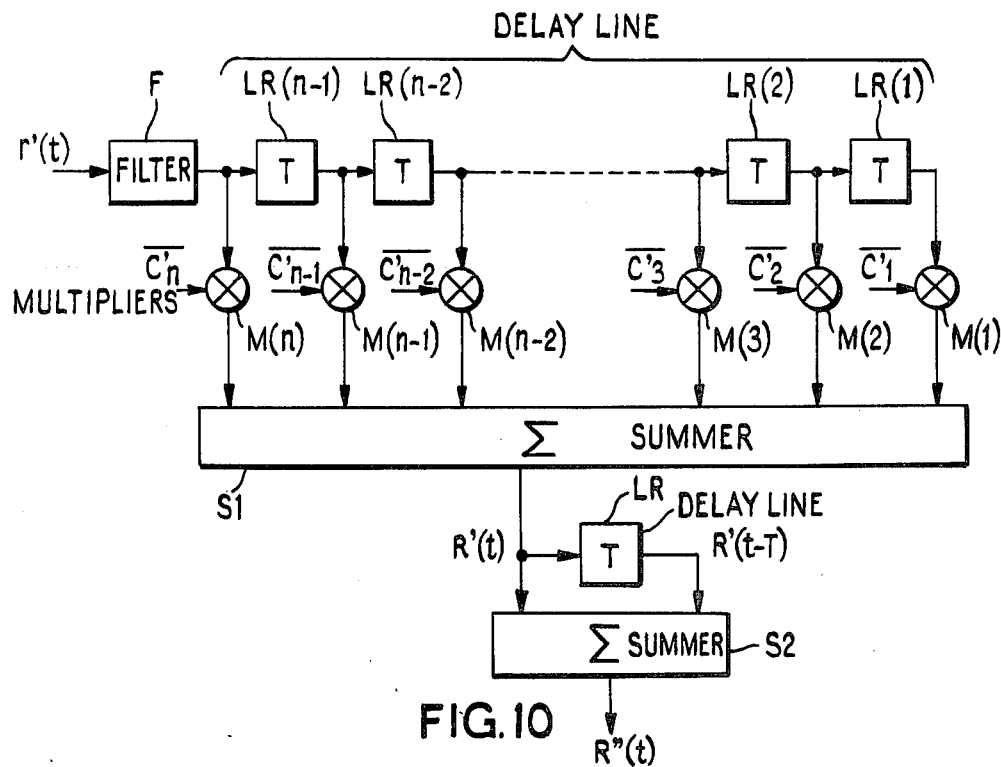
FIGS. 10 and 11 show embodiments of the autocorrelation sidelobe suppression device according to the invention, for an even value of n.

FIG. 10 shows a block diagram of the autocorrelation sidelobe suppressor according to the invention, for the case in which n is even. This first device is derived from the matched receiver in FIG. 2. We again find the filter F matched to the "subpulse", the (n−1) identical delay lines LR(1) to LR(n−1) each introducing a delay T equal to the width of the "subpulse" (one bit delay), the n multipliers M(1) to M(n), and the adder S1. The filter F receives the video signal r'(t) corresponding to the signal s'(t) modified with respect to s(t) as described above. Only the multiplication coefficients $\overline{C}_i$ are changed. We shall call the new coefficients $\overline{C}'_i$. They are obtained by multiplying the coefficients $\overline{C}_i$ alternately by $+1$ and $-1$. Thus:

$\overline{C}'_1 = +\overline{C}_1$ $\overline{C}'_2 = -\overline{C}_2$ $\overline{C}'_3 = +\overline{C}_3$

...

$\overline{C}'_{n-2} = -\overline{C}_{n-2}$ $\overline{C}'_{n-1} = +\overline{C}_{n-1}$ $\overline{C}'_n = \overline{C}_n$ The output of the adder S1 is the autocorrelation signal R'(t) of the signal s'(t), whose waveform is shown in FIG. 6. The signal R'(t) is then delayed ty a time T by means of a delay line LR, then delivering the signal R'(t−T). The two signals R'(t) and R'(t−T) are then added together in an adder (summer) S2 delivering the autocorrelation signal R''(t) having zero sidelobe, whose waveform is shown in FIG. 8.

Figure 11:
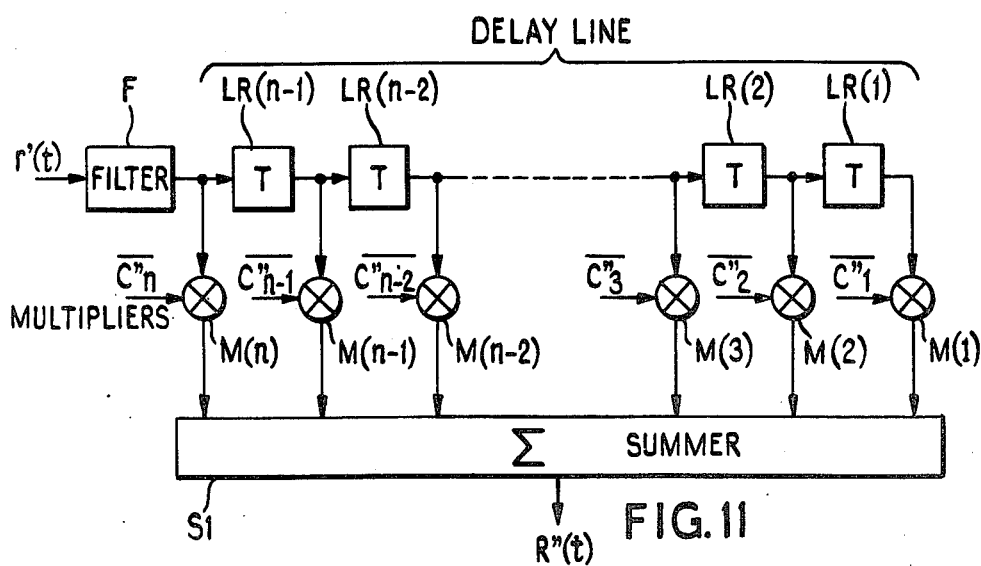

FIG. 11 shows a diagram of a simplified variation of the device of FIG. 10 (n even). This variant is obtained by changing the coefficients $\overline{C}'_i$ so as to eliminate the delay line LR and the adder S2. The new coefficients will be called $\overline{C}''_i$. The output of the adder S1 then delivers the autocorrelation signal R''(t) directly. The coefficients $\overline{C}''_i$ are derived from coefficients $\overline{C}_i$ by the following equations:

$$\overline{C''}_1 = \overline{C}_1 - \overline{C}_n \qquad \text{Eqn. (1)}$$

$$\overline{C''}_i = (-1)^{i-1}(\overline{C}_i - \overline{C_{i-1}}) \text{ for } i \neq 1.$$

We then have:

$$\overline{C''}_1 = \overline{C}_1 - \overline{C}_n$$

$$\overline{C''}_2 = -\overline{C}_2 + \overline{C}_1$$

$$\overline{C''}_3 = \overline{C}_3 - \overline{C}_2$$

...

$$\overline{C''}_n = \overline{C}_n + \overline{C_{n-1}}$$

Figure 12:
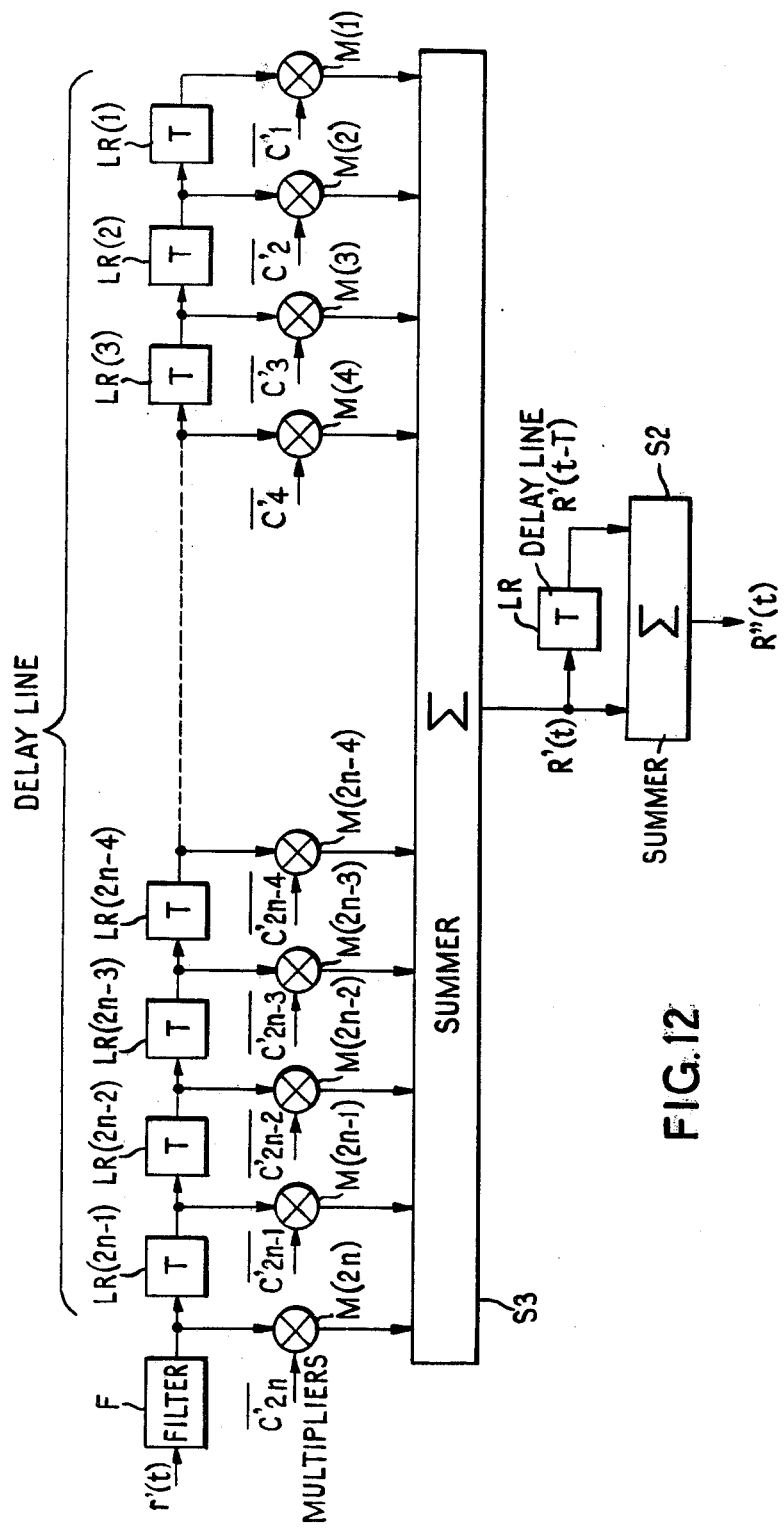
FIGS. 12, 13 and 14 show embodiments of the autocorrelation sidelobe suppression device according to the invention, for an odd value of n.

FIG. 12 shows a block diagram of the autocorrelation sidelobe suppression device, for the case in which n is odd. We again find the filter matched to the "subpulse". Since n is odd, the length of the modified phase code is equal to 2nT and, therefore, (2n−1) delay lines LR(1) to LR(2n-1) are required, each introducing a delay T, as well as 2n multipliers M(1) to M(2n) receiving, respectively, the 2n coefficients $\overline{C''}_i$ (i=1 to 2n). An adder S3 with 2n inputs delivers the signal R'(t). As in the case of FIG. 10, the signal R'(t) is delayed by a time T by means of the delay line LR delivering the signal R'(t−T). The two signals are then added together in the adder S2 delivering the signal R"(t) whose waveform is shown in FIG. 9.

Figure 13:
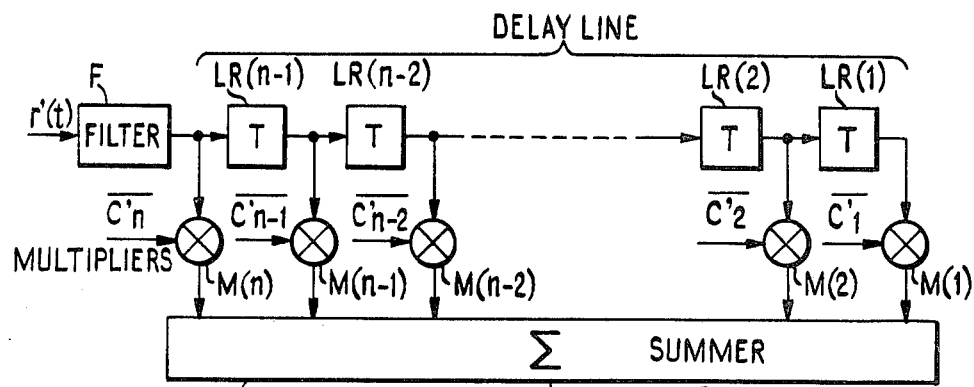
Figure 13:
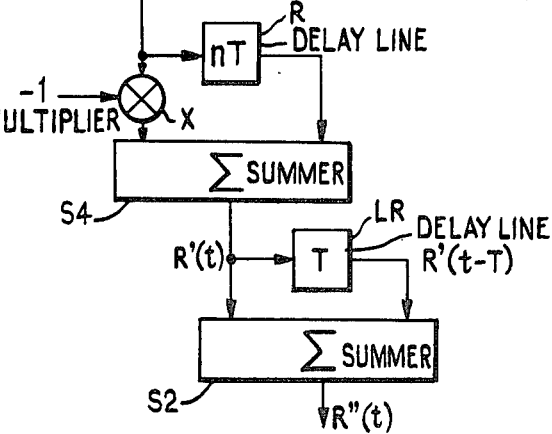

FIG. 13 shows the diagram of a simplified version of the device in FIG. 12 (n odd), permitting the number of delay lines and multipliers to be reduced. This variant is obtained from a relationship between the multiplication coefficients $\overline{C''}_i$ for the case in which n is odd. In fact, it will be seen from the signal s'(t) in FIG. 5 that:

$$C_{i+n} = -C_i \qquad \text{Eqn. (2)}$$

Taking this equation into account, the device in FIG. 13 will include only (n−1) delay lines LR(1) to LR(n−1) and n multipliers M(1) to M(n) receiving, respectively, the coefficients $\overline{C''}_i$ (i=1 to n). Again, we find the adder S1 at the output of the n multipliers. In order to take into account the (−) sign present in equation (2), the output signal of the adder S1 is, on the one hand, multiplied by −1 by means of a multiplier X and, on the other hand, delayed by a time nT by means of a delay line R. The autocorrelation signal R'(t) is obtained by adding together, in an adder S4, the output signals from the multiplier X and the delay line R. As in the case of FIGS. 10 and 12, the signal R"(t) is then obtained from R'(t) and R'(t−T) by means of a delay line LR and the adder S2.

Figure 14:
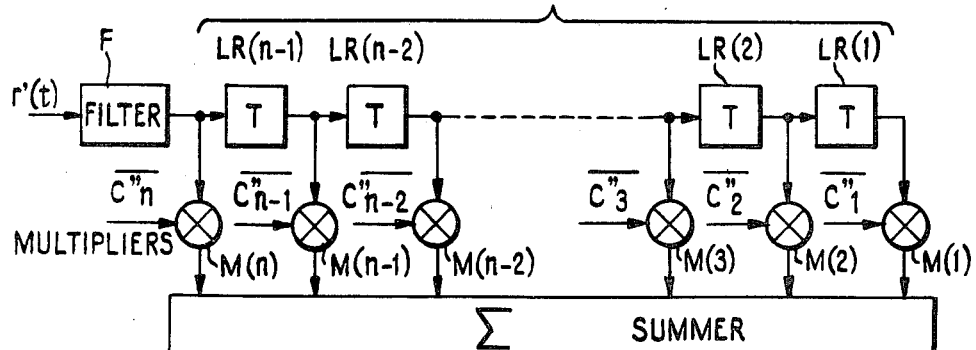
Figure 14:
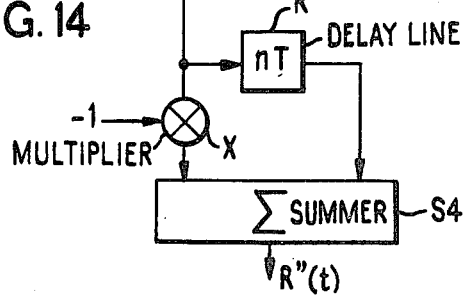

FIG. 14 shows the diagram of a further simplified variation of the device in FIG. 12 (n odd), derived from FIG. 13. This variant consists in eliminating the delay line LR and the adder S2 of the device of FIG. 13 by replacing the coefficients $\overline{C''}_i$ by the coefficients $\overline{C''}_i$, taking into account the equations (1) which are equally valid for an odd value of n. This is the simplification which was made in FIG. 11, with respect to FIG. 10, for the case in which n was even.

Figure 15:
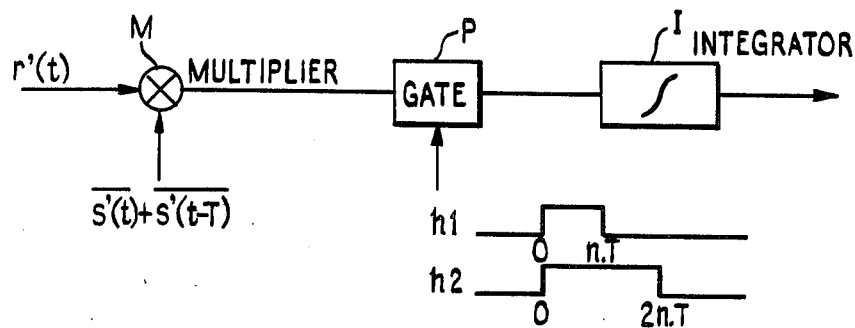
FIG. 15 shows another embodiment of the autocorrelation sidelobe suppression device according to the invention, usable with either an even or odd value of n.

Another autocorrelation sidelobe suppression device in accordance with the principles of the invention, derived from the matched receiver in FIG. 3, is shown in FIG. 15. Again, we find the multiplier M followed by the gate P and the integrator I. The multiplier M receives, on the one hand, the reflected signal r'(t) and, on the other hand, the sum of the signals s'(t) and s'(t−T).

In order to match the receiver to a period of the signal s'(t), the gate P should conduct during a time nT when n is even, and during a time 2nT when n is odd. To do this, it is controlled by the pulse h1 of width nT, or by a pulse h2 of width 2nT. The integrator I delivers an autocorrelations signal whose value corresponds to that of the clipped autocorrelation peaks shown in FIGS. 8 and 9, depending upon the case.

Figure 16:
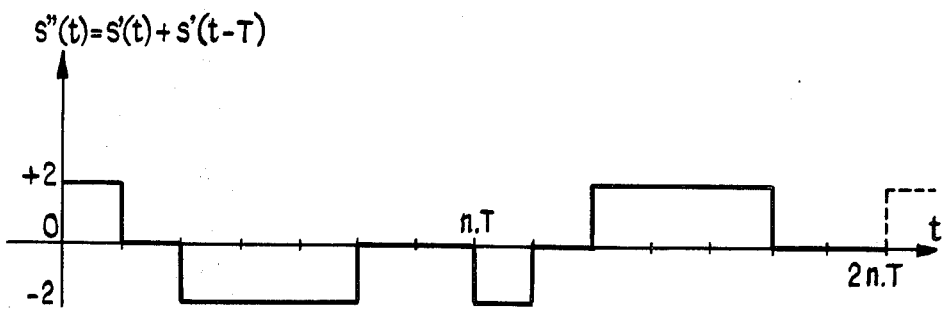
FIG. 16 shows the periodic signal s''(t) obtained by the addition of the periodic signal s'(t) and s'(t−T).

FIG. 16 shows the signal s"(t)=s'(t)+s'(t−T). This is a periodic signal having a period of 2nT, because n is odd. It will be noted that, when the coefficients $\overline{C}_i$ take only two equal and opposite value +1 and −1, the coefficients $\overline{C''}_i$ or the signal S"(t) assume only three values +2, 0 and −2 and are, thus, easy to produce.

Although the invention has been described with particular embodiments, it is clearly not limited to the said embodiments and is capable of other variants or modifications falling within its scope. In particular, the selection of a phase code modified in the way described above with respect to a "cyclically almost perfect code" is not the only possibility. Any code can be used whose autocorrelation function contains sidelobes which present a symmetry permitting a zero level to be obtained by time-shifting and addition. Moreover, the invention has been described in connection with the signals in the video domain, but it could just as well be applied, after a few changes which the person skilled in the art could apply (the principles of the invention remaining unchanged), to the intermediate frequency signal. Likewise, the gate and integrator of FIGS. 3 and 15 could be replaced, if desired, by a low-pass filter followed by a sampler.

What is claimed is:

1. Autocorrelation apparatus for a psuedo-random coded radar employing means for generating a continuous periodic phase code whose code sequence is such that the sum itself and the same code shifted one bit has a uniform zero amplitude between main correlation peaks, comprising:

first means for obtaining the autocorrelation signal from said phase-code as a first autocorrelation function;

second means for obtaining the autocorrelation signal from said phase-code shifted one bit as a second autocorrelation function;

and third means for summing said first and second autocorrelation functions to provide a third autocorrelation function in which sidelobes are suppressed between main autocorrelation peaks.

2. Apparatus according to claim 1 in which said means for generating said phase code is arranged to generate a periodic signal s'(t) formed of a series of subpulses each of duration T, and including means for generating said periodic signal s'(t) by multiplying alternately by +1 and −1 the successive subpulses of a periodic signal s(t) generated over the period by a "cyclically almost perfect code" of n bits of level $C_i$ where i=1 to n.

3. An autocorrelator with sidelobe suppression, comprising:

in a pseudo-random coded CW radar system, autocorrelation apparatus which includes processing means for generating a pseudo-random code and for autocorrelating a coded signal s'(t), said processing means including a conventional receiver matched to a period of said s'(t) signal, the combination comprising:

first means for delaying the autocorrelated signal by a time T corresponding to the duration of one code bit to provide a delayed autocorrelated signal;

and second means comprising a summer for providing the sum of said autocorrelated and delayed autocorrelated signals, thereby to provide an autocorrelation function free of sidelobes between successive correlation peaks.

4. An autocorrelation sidelobe suppression device according to claim 2, usable for the case in which n is even, containing a filter matched to the "subpulse", receiving the reflected signal r'(t) corresponding to the transmitted signal s'(t), followed by (n−1) identical delay lines each introducing a delay T, n multipliers placed at the output of the said filter and of the said delay lines and respectively carrying out the multiplication of the n output signals by n coefficients $\overline{C''}_i$ (i=1 to n), and an adder S1, characterized in that the coefficients $\overline{C''}_i$ are related to the coefficients $\overline{C_i}$, conjugates of $C_i$, by the equations:

$$\overline{C''}_1 = \overline{C}_1 - \overline{C}_n$$

$$\overline{C''}_i = (-1)^{i-1} (\overline{C_i} - \overline{C_{i-1}}) \text{ for } i \neq 1.$$

5. A device according to claim 4, usable for the case in which n is odd, characterized in that it also contains another adder S4 receiving, on the one hand, the output signal of the adder S1 delayed by a time nT by means of a delay line and, on the other hand, the output signal of the said adder S1 multiplied by −1 by means of a multiplier.

6. An autocorrelation sidelobe suppression device according to claim 2, containing a multiplier receiving the reflected signal r'(t) and followed by a gate and an integrator, characterized in that:

the said multiplier also receives the two added signals $\overline{s'(t)}$ and $\overline{s'(t-T)}$;

the said gate conducts during a time nT when n is even and during a time 2nT when n is odd.

7. A device according to claim 2 further defined in that means are included for applying said level of $C_i$ with a value of +1.

8. A device according to claim 2 further defined in that means are included for applying said level of $C_i$ with a value of −1.

9. A device according to claim 4 further defined in that means are included for applying said level of $C_i$ with a value of +1.

10. A device according to claim 4 further defined in that means are included for applying said level of $C_i$ with a value of −1.

11. A device according to claim 6 further defined in that means are included for applying said level of $C_i$ with a value of +1.

12. A device according to claim 6 further defined in that means are included for applying said level of $C_i$ with a value of −1.

* * * * *